United States Patent [19]
Doi

[11] 4,322,934
[45] Apr. 6, 1982

[54] LAWN MOWER
[75] Inventor: Hachiro Doi, Saitama, Japan
[73] Assignee: Fuso Keigokin Co., Ltd., Tokyo, Japan
[21] Appl. No.: 117,355
[22] Filed: Jan. 31, 1980
[30] Foreign Application Priority Data
Nov. 26, 1979 [JP] Japan ............................... 54-153160
[51] Int. Cl.³ ............................................. A01D 69/06
[52] U.S. Cl. ..................................... 56/11.1; 56/11.2; 474/25
[58] Field of Search ...................... 56/11.1, 11.6, 11.2; 474/46, 25

[56] References Cited
U.S. PATENT DOCUMENTS

| | | | |
|---|---|---|---|
| 2,823,507 | 2/1958 | Cooper et al. | 56/11.6 |
| 4,019,398 | 4/1977 | Wesemeier | 474/46 |
| 4,130,172 | 12/1978 | Moody | 474/25 |
| 4,172,351 | 10/1979 | Scanland | 56/255 |
| 4,176,560 | 12/1979 | Clarke | 56/11.1 |

*Primary Examiner*—Robert A. Hafer
*Attorney, Agent, or Firm*—Birch, Stewart, Kolasch & Birch

[57] ABSTRACT

The present invention is directed to a lawn mower wherein a lawn mower body frame includes a motor and an operatively connected transmission. The lawn mower motor body frame is supported by front and rear wheels. At least the rear wheels are independently supported on separate shafts which are rotatably disposed with respect to the lawn mower body frame. Pulleys are positioned concentrically on each of the separate shafts in opposing, spaced apart relationship to define a gap therebetween. A belt is disposed in said gap and operatively connected to the motor through the transmission to impart rotation to the rear wheels. The pulleys, the separate shafts, and the rear wheels are positioned relative to each other to permit slippage therebetween to facilitate a change in the direction of the lawn mower.

8 Claims, 8 Drawing Figures

FIG. 3
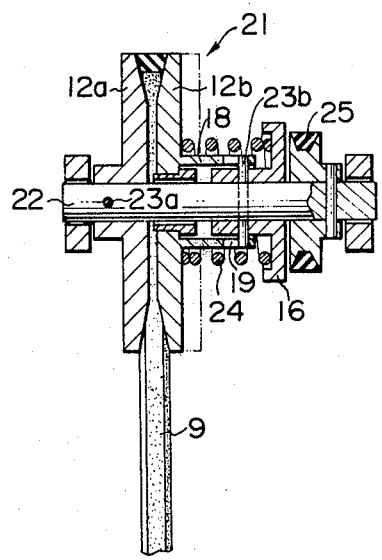
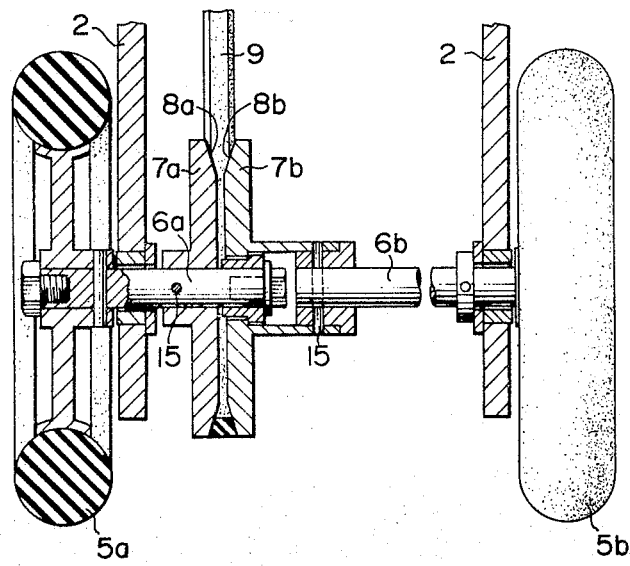

LAWN MOWER

BACKGROUND AND SUMMARY OF THE INVENTION

The present invention relates to a lawn mower. More particularly, the present invention is directed to an automotive lawn mower.

Previously, many types of lawn mowers have been provided, but they are inconvenient for use because their mechanisms are complex or they are too large to handle.

Accordingly, an object of the present invention is to provide a lawn mower with a relatively simple automotive mechanism which can be combined compactly into a lawn mower body.

Another object of the present invention is to provide a lawn mower which can be continuously operated, can be readily stopped or the direction thereof can be readily changed, optionally and easily. Advantageously, the cutting blades will continue to rotate during a stop condition and/or while changing the direction thereof.

A further object of the present invention is to provide a lawn mower having an infinitely variable running speed.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only and, thus, are not limitative of the present invention, and wherein.

FIG. 3 is an expanded sectional view taken on line (x)—(x) of FIG. 1;

FIG. 7 shows the state in which the level setting mechanism is set at a high position and FIG. 8 shows the state in which the level setting mechanism is set at a low position.

DETAILED DESCRIPTION OF THE INVENTION

Figure 1:
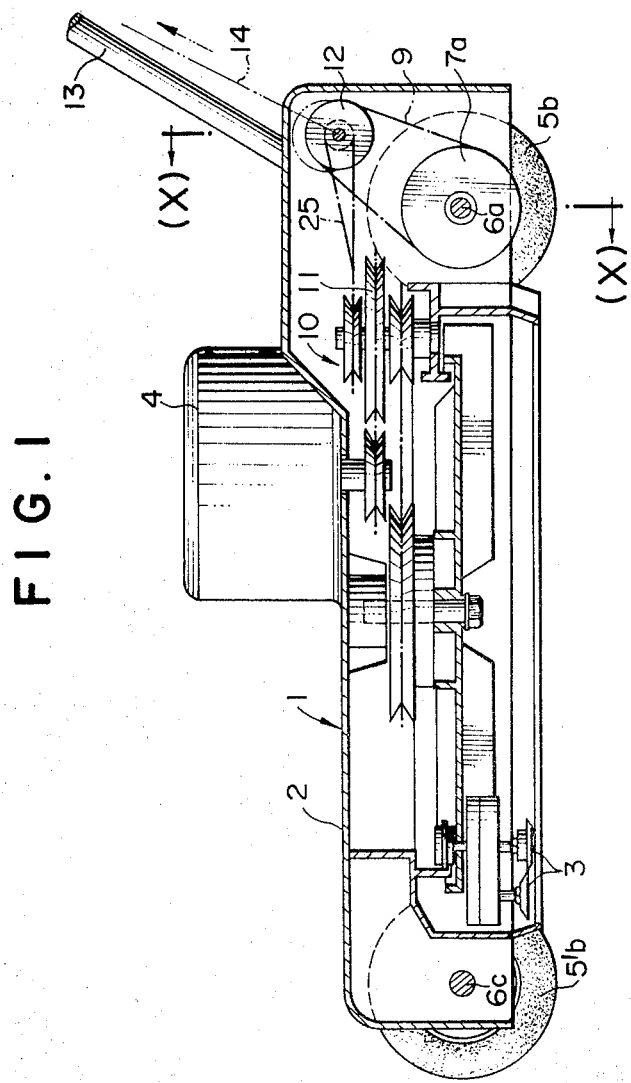
FIG. 1 is a partial cutaway side view of one embodiment of the present invention.

Referring now to the drawings, the present invention comprises a lawn mower body 1 composed fundamentally of a frame 2 forming a skeleton of the body, cutting blade 3 supported on the frame, and a motor 4 that is, for example, an electric motor or gasoline engine, or the like. The lawn mower of the present invention includes a lawn mower itself regardless of the type of mower utilized, such as a rotary lawn mower, a clipper lawn mower, a reel lawn mower, or the like. The lawn mower shown in the drawings is an example of a planetary lawn mower covered by Japanese Pat. No. 9123664, patented to the applicant of the present invention, and having cutting blades rotating with a planer rotation.

Wheels are provided on the under part of the lawn mower body 1 to movably support the lawn mower body.

Two to four wheels are provided on the left side and right side, in the front and rear of the lawn mower body 1. In the embodiment shown in the drawings, four wheels are provided on the left side and right side in the front and rear of the lawn mower body 1. Wheels are connected to the frame 2 of the lawn mower body 1 through the shafts. According to the present invention, at least rear wheels 5a and 5b on the left side and right side are independently supported by two separate shafts 6a and 6b. That is, left and right front wheels 5'a and 5'b are supported rotatably generally by one one shaft 6c and connected to the frame 2. On the other hand, the left rear wheel 5a and the right rear wheel 5b are supported by the two separate shafts 6a and 6b, which are independently rotatable and connected to the frame 2.

The left and right rear shafts 6a and 6b are fixed together to the respective left and right rear wheels. They are mounted on the frame 2 and are independently rotatable with the respective wheels 5a and 5b, and positioned concentrically with respect to each other. Pulley sections or pulley 7a and 7b are provided on the ends opposite to the respective wheels of the shafts. The pulleys 7a and 7b are fixed to respective shafts 6a and 6b to rotate with said left and right rear shafts 6a and 6b. The pulleys are positioned close to each other in opposing concentric positions with a small clearance provided therebetween to form a V-grooved pulley, the perimeters 8a and 8b of the opposed side surfaces of the pulleys 7a and 7b being shaped to form oblique surfaces for receiving a belt 9 which is connected over both pulleys 7a and 7b. As a belt member, a V-belt 9 is positioned between both pulleys 7a and 7b to form a V-grooved pulley. The belt member is optionally connected to a motor 4 which also drives the cutting member 3 through an appropriate transmission. The motor drives the left and right wheels 5a and 5b fixed to both pulleys 7a and 7b which serves to run and stop the lawn mower.

An appropriate transmission may be used to drive and stop the belt. The transmission shown in the drawings comprises a reduction pulley 11 connected to a motor 4 and a transmission pulley 12 vertically mounted within the frame 2. The belt 9 is connected between the transmission pulley 12 and pulleys 7a and 7b. Thus, the transmission to the motor can be engaged or disengaged by moving the transmission pulley 12 vertically to change the tension of the belt 9. The transmission pulley 12 is moved vertically by a wire 14 which extends to the handle rod 13.

Figure 2:
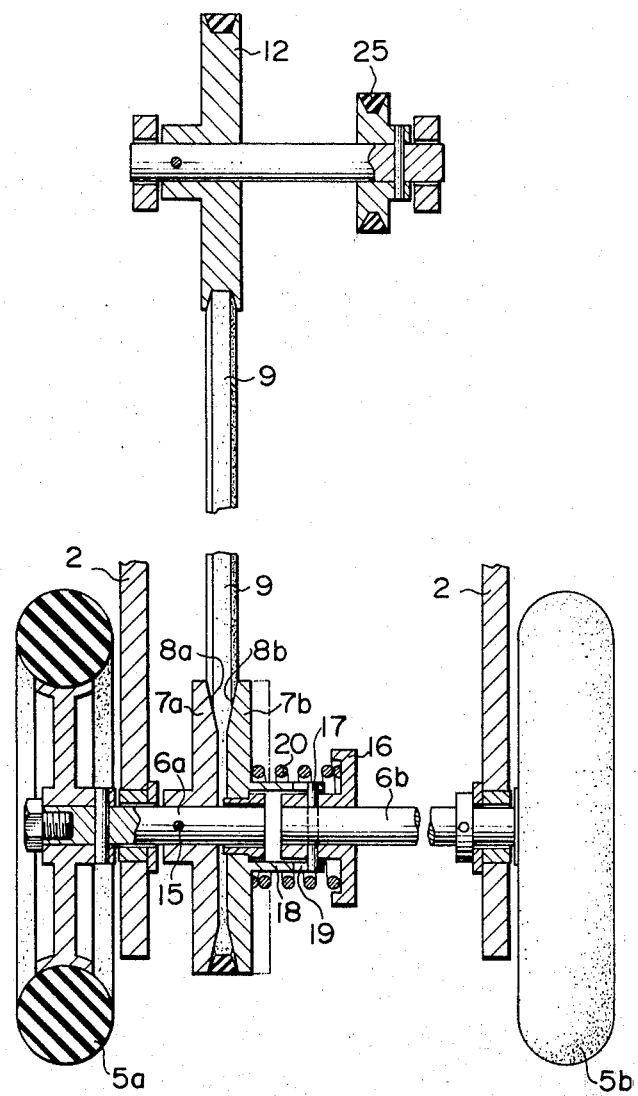
FIG. 2 is an expanded sectional view taken along line (x)—(x) of FIG. 1.
Figure 4:
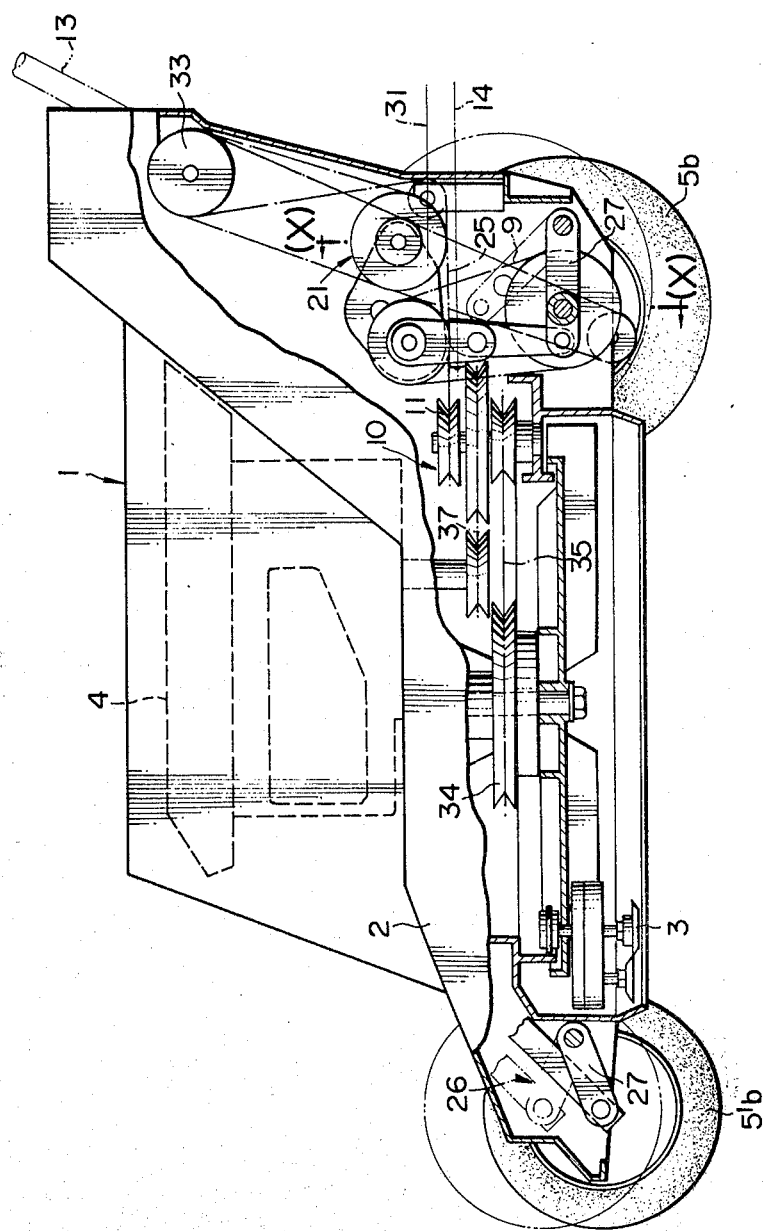
FIG. 4 is a partial cutaway side view of another embodiment of the present invention.
Figure 5:
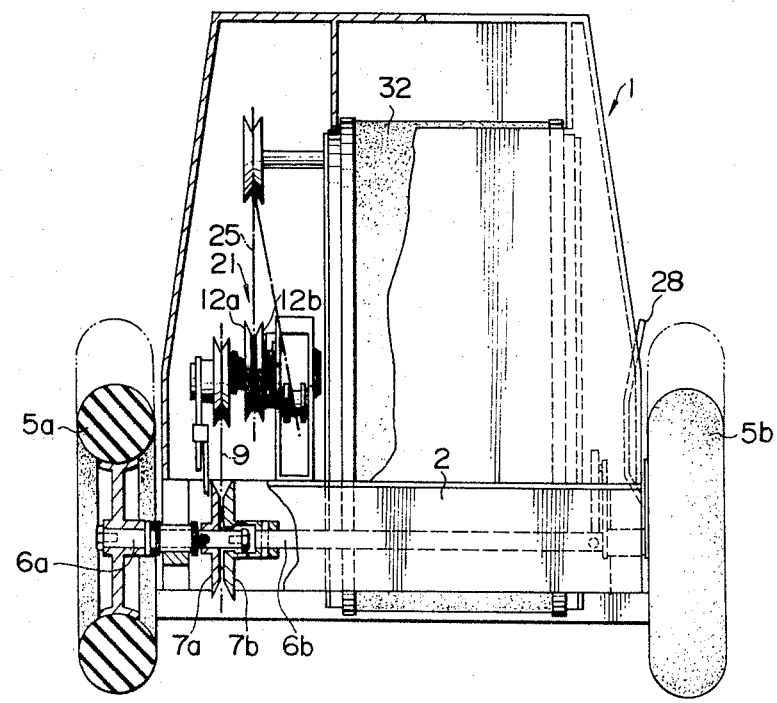
FIG. 5 is a partial cutaway rear elevational view.
Figure 6:
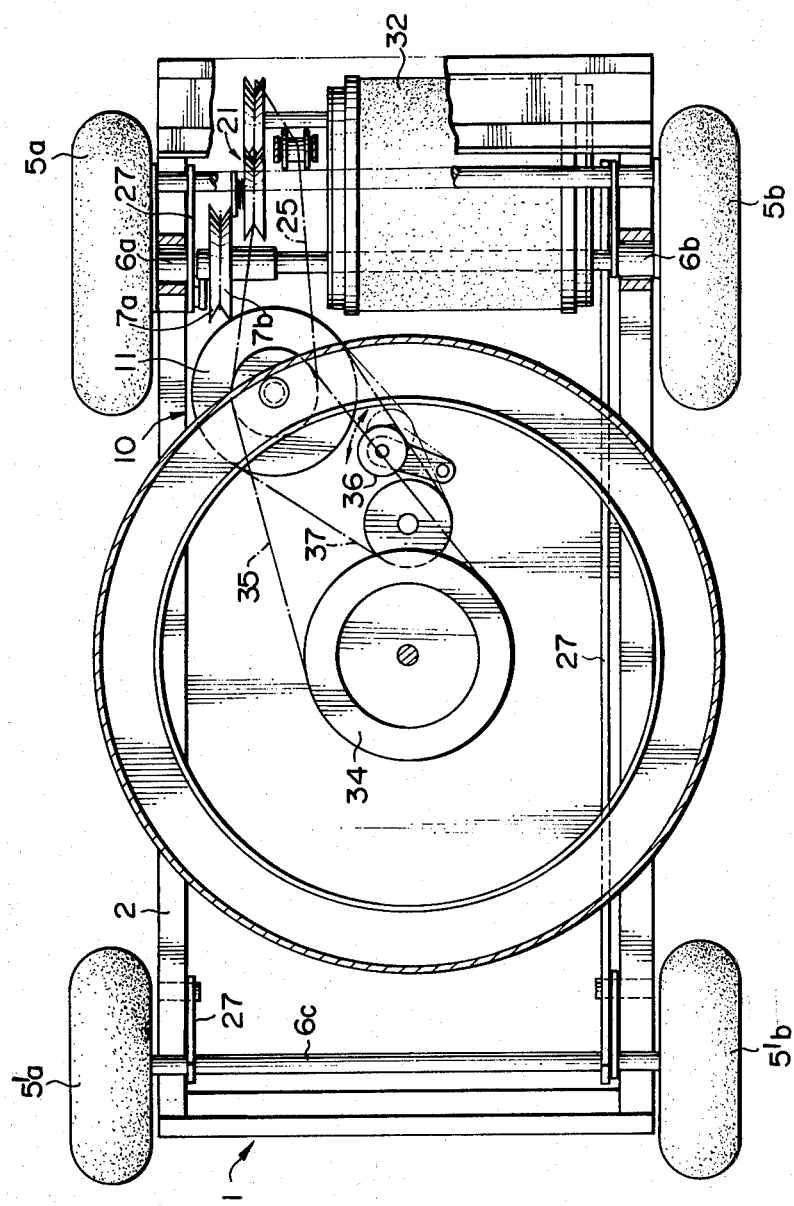
FIG. 6 is a partial cutaway bottom view.

In the lawn mower of the present invention, as shown in FIG. 1 and FIG. 2, the pulleys 7a and 7b are fixed to the shafts 6a and 6b so as not to rotate circumferentially, and are fixed to said shafts so that at least one of the pulleys is slidable along the shaft, whereby the running speed can be continuously controlled. That is, the left side pulley 7a is fixed to the left side shaft 6a with a pin 15, and the right side pulley 7b and a stopper element 16 are fixed together so as not to rotate circumferentially. Thus, the right side pulley and the stopper element are fixed along the shaft on which a long guide hole 19 is provided at a boss 18 to which said pin 17 is fitted. A spring 20 is provided between the pulley 7a and the stopper 16 and the belt 9 is forced to slide the pulley 7b along the shaft against the force of the spring 20 by increasing tension of the belt 9 connecting over both left and right pulleys 7a and 7b, through operation of the transmission pulley 12. Thus, the position of the belt 9 between both pulleys can be optionally controlled, whereby rotation of both pulleys 7a and 7b are optionally and continuously controlled, regardless of the constant rotational speed of the belt 9.

In the lawn mower of the pesent invention, as shown in FIG. 3, pulleys 7a and 7b are fixed to the respective left and right shafts 6a and 6b. However, the running speed can be varied by operating a speed change device in the transmission 10. The mechanism of this speed change device 21 is identical with that of the left and right pulleys 7a and 7b. That is, two transmission pulleys 12a and 12b are positioned on one supporting shaft 22 in opposition to each other and in close proximity to each other with a small clearance therebetween to form a V-grooved pulley. The pulleys 12a and 12b are fixed to the shaft with pins 23a and 23b, so as not to rotate circumferentially and at least one of the pulleys 12a or 12b is slidably mounted thereon. A V-belt is connected between the speed change device 21 and both pulleys 7a and 7b on shafts 6a and 6b. The belt 9 forces the pulley 12b to slide along the shaft against the force of the spring 24 applied to the transmission pulley 12b and is forced to move deeply and shallowly between both transmission pulleys 12a and 12b by the vertical operation of the speed change device 21 itself or by connecting the belt 9 to another tension pulley to increase the tension of the belt 9. Therefore rotation of both transmission pulleys 12a, 12b, that is, the rotation of both pulleys 7a and 7b on the shafts and 6a and 6b connected to the belt 9 can be controlled optionally and continuously regardless of the constant rotational speed of the transmission belt 25 driven by the motor 4.

Figure 7:
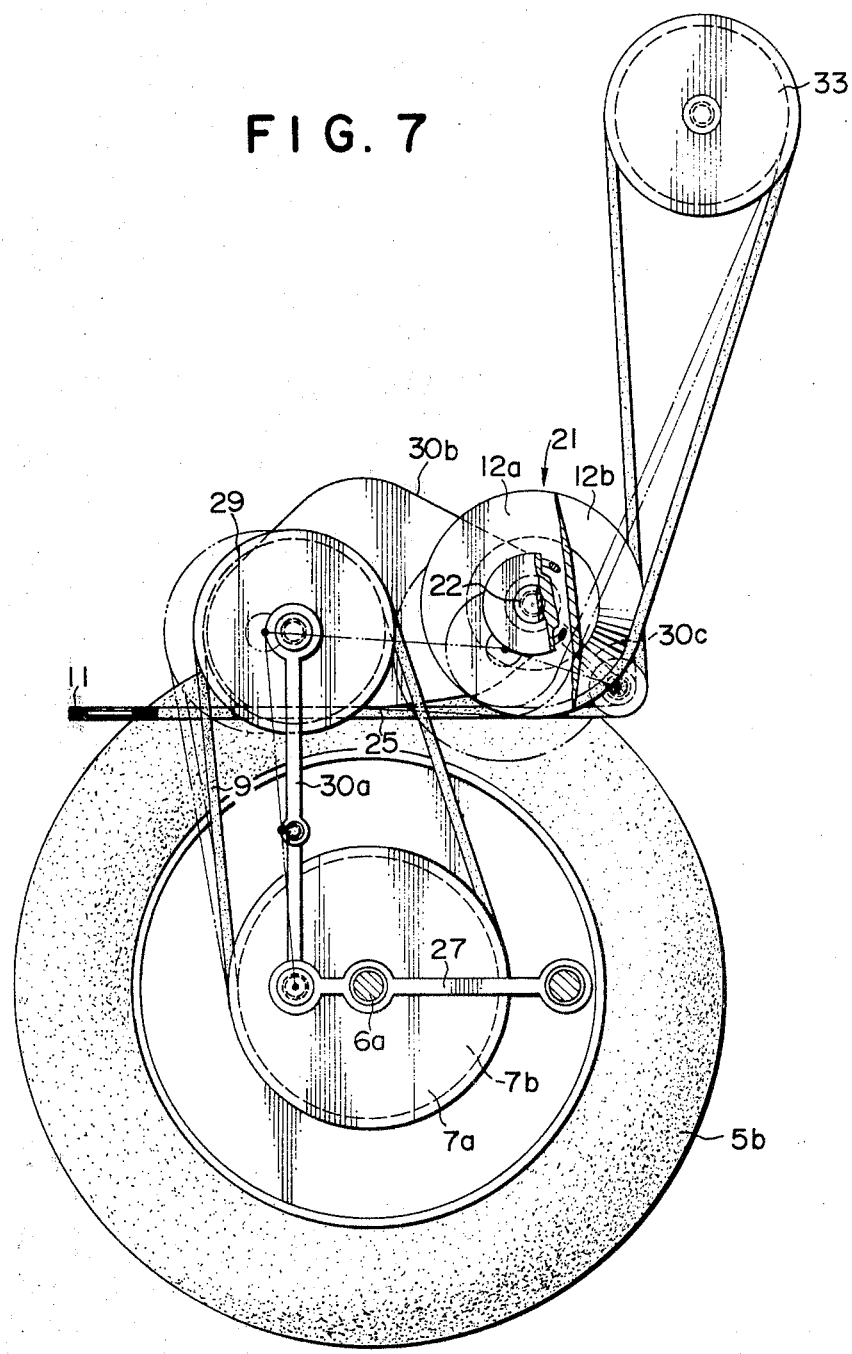
FIG. 7 and 8 are partial cutaway expanded side views showing connecting relations between the pulley of the wheels and the change pulley, and the speed change device and the pulley of the wheels, where
Figure 8:
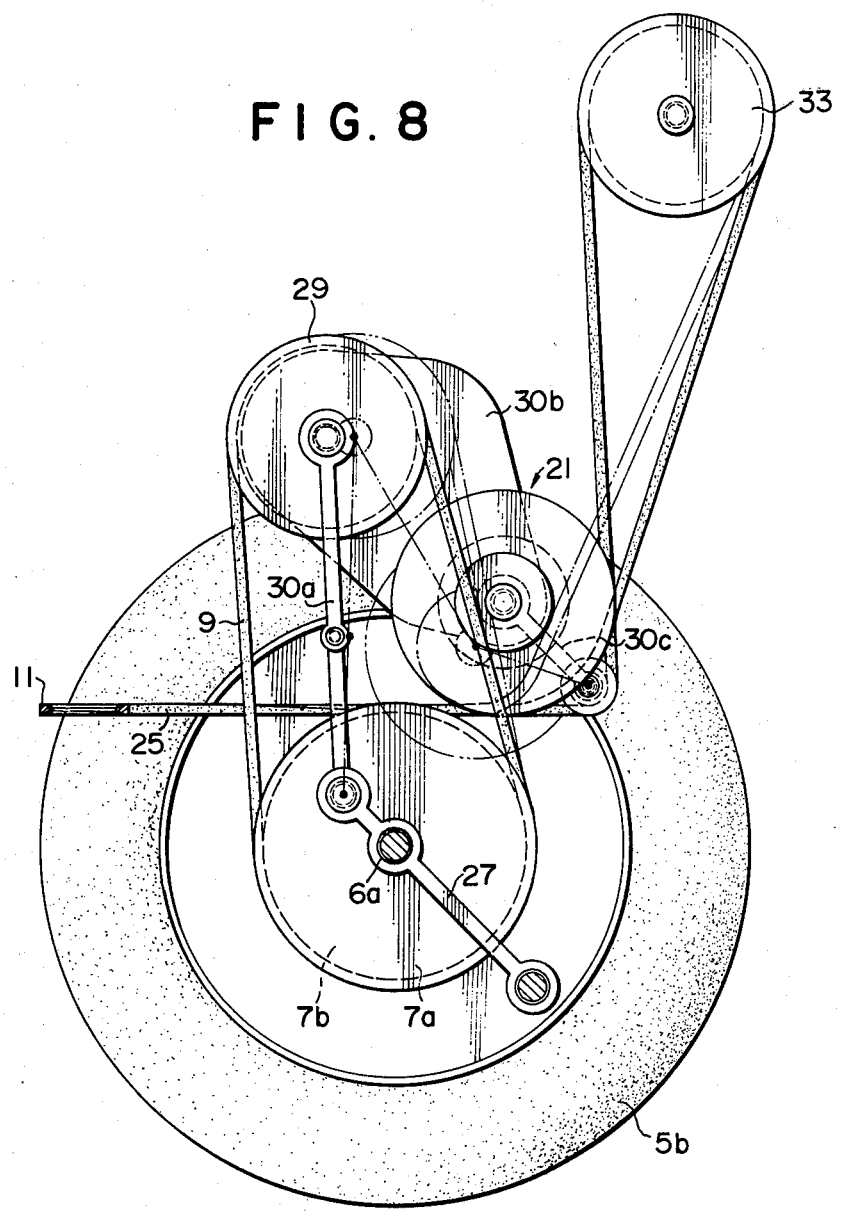

In the lawn mower of FIGS. 4 through 8, wheels 5a, 5b, 5'a, 5'b are interlocked with a cutting height adjusting mechanism 26 of the lawn mower body 1, and the running speed can be controlled through the change pulley 29 supported movably with a link and the speed change device 21. The cutting height adjusting mechanism 26 of the lawn mower body serves to control the height of the cut lawn. The wheels of the shafts 6a and 6b and 6c are connected with the link 27 and can be moved vertically through the operation of handle 28 to set the height of the lawn mower body 1. This mechanism is identical with that of conventional lawn mowers. This embodiment of the lawn mower is different from that of FIGS. 1 and 2 in the following points. That is, the change pulley 29 is provided to follow up the motion of the cutting height adjusting mechanism 26, and the change pulley 29 and speed change device 21 are movably connected to a series of links 30a, 30b, and 30c. That is, as shown in FIG. 7 and FIG. 8, the speed change device 21 and the change pulley 29 are movably connected to a series of links 30a, 30b, and 30c at the knuckles interlocking with the link 27 of the cutting height adjusting mechanism connected to the shafts 6a and 6b. Both pulleys 7a and 7b fixed to the wheels 5a and 5b and the change pulley 29 are connected by the belt 9. The change pulley 29 and the speed change device 21 are connected with a gear train serving as the link 30. The speed change device 21 is connected to the reduction pulley 11 of the motor 4 with the transmission belt 25, and the driving force of the motor 4 is successively transmitted to both pulleys 7a and 7b of the wheels 5a and 5b. By moving the speed change device 21 vertically through operation of the wire 31 to change the tension of the transmission belt 25, the transmission belt 25 is forced to slide the pulley 12b along the shaft against the force of the spring 24 against the transmission pulley 12b which forces it to move both deeply and shallowly between both transmission pulleys 12a and 12b, whereby rotation of both pulleys 7a and 7b of the wheels 5a and 5b, rotating through the change pulley 29 is controlled continuously regardless of the constant rotational speed of the transmission belt 25. Therefore then, by vertically operating the change pulley which is different from the speed change device 21 through the wire 14 to change the tension of the belt 9, the driving force of the motor 4 is engaged or disengaged with the belt 9. Thus, rotation of both pulleys 7a and 7b fixed to the wheels 5a and 5b, that is, the running of the lawn mower can be continued or discontinued.

Element 32 in the drawings is a conveyor belt which is provided to carry grass clippings to the rear of the lawn mower body 1. Element 33 is a driving pulley which is provided to drive the conveyor belt 32.

A pulley 34 for rotating the cutting blade 3 is connected to the reduction pulley 11 of the motor 4 with a belt 35. The driving force of the motor 4 branches through the reduction pulley 11 to the pulley 34 which rotates the cutting blade 3 and to the speed change device 21. Thus, cutting blade 3 and the wheels 5a and 5b can be operated independently. Element 36 in the drawings is an operation pulley which is provided to transmit or cut the driving force of the motor 4 to the reduction pulley 11 by changing the tension of the belt 37 connecting the motor 4 and the reduction pulley 11.

The lawn mower of the present invention is constructed as outlined above, and the mechanism which runs the lawn mower body is very simple and can be compactly combined into a small-size push power lawn mower. Thus, the present invention can provide a lightweight self-propelled lawn mower at a low price, in which the running thereof can be continued or discontinued and the running speed thereof can be easily and optionally controlled continuously through remote operation. In this connection, it is to be appreciated that, even when the lawn mower is running, the pulleys 7a and 7b of the wheels 5a and 5b can be forced to slip on the belt so that the direction of the lawn mower can be readily changed.

Moreover, because the belt connected to the pulleys 7a and 7b of the wheels 5a and 6b can be optionally connected to the motor, lawn mowing work can be continued while driving the cutting blade during running, or stopped and/or the direction thereof can be changed. When the lawn mower is stopped, the direction of the lawn mower can be easily changed because the left and right wheels thereof rotate independently.

Furthermore, in the device of the present invention, because the change pulley and the speed change device are movably supported with a link mechanism, the cutting height adjusting mechanism of the lawn mower body can be readily made, and the precise motion thereof can be expected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A lawn mower comprising:
   a lawn mower body frame including a motor and an operatively connected transmission means;
   said lawn mower body frame being supported by front and rear wheel means, at least said rear wheel means being independently supported on separate first and second shaft means which are rotatably disposed with respect to said lawn mower body frame;
   first and second pulley means concentrically positioned upon each of said separate first and second shaft means, respectively, in opposing, spaced apart relationship to define a gap therebetween;
   belt means disposed in said gap and operatively connected to said motor means through said transmission means, said belt means being under a predetermined tension to normally impart rotation to said rear wheel means; and
   said first and second pulley means, said separate first and second shaft means and said rear wheel means being positioned relative to each other to permit slippage between said first pulley means positioned on said first shaft means and said second pulley means positioned on said second shaft means when a predetermined load is applied to one of said rear wheel means to facilitate a change in the direction of said lawn mower.

2. The lawn mower of claim 1 wherein the opposing surfaces of said spaced apart first and second pulley means are oblique surfaces and at least one of said first and second pulley means is slidable along said shafts.

3. A lawn mower comprising:
   a lawn mower body frame including a motor and an operatively connected speed change device;
   said lawn mower body frame being supported by front and rear wheel means, at least said rear wheel means being independently supported on separate first and second shaft means which are rotatably disposed with respect to said lawn mower body frame;
   first and second pulley means concentrically positioned upon each of said separate first and second shaft means in opposing, spaced apart relationship to define a gap therebetween;
   belt means disposed in said gap and operatively connected to said motor means through said speed change device, said belt means being under a predetermined tension to normally impart rotation to said rear wheel means;
   said first and second pulley means, said separate first and second shaft means and said rear wheel means being positioned relative to each other to permit slippage between said first pulley means positioned on said first shaft means and said second pulley means positioned on said second shaft means when a predetermined load is applied to one of said rear wheel means to facilitate a change in the direction of said lawn mower;
   said speed change device including additional pulley means concentrically disposed upon an additional shaft means in opposing, spaced apart relationship to define a gap therebetween, and at least one of said additional pulley means being slidable along said additional shaft.

4. A lawn mower comprising:
   a lawn mower body frame including a motor, a change pulley with an associated link mechanism, and an operatively connected transmission means;
   said lawn mower body frame being supported by front wheels and rear wheels, said rear wheels being independently supported and fixed to separate first and second shaft means;
   first and second pulley means concentrically positioned upon each of said separate first and second shaft means in opposing, spaced apart relationship to define a gap therebetween;
   belt means positioned within said gap and operatively connected to said motor means through said change pulley and link mechanism and said transmission means, said belt means being under a predetermined tension to normally impart rotation to said rear wheel means;
   said first and second pulley means, said separate first and second shaft means and said rear wheel means being positioned relative to each other to permit slippage between said first pulley means fixed to said first shaft means and said second pulley means fixed to said second shaft means when a predetermined load is applied to one of said rear wheel means to facilitate a change in the direction of said lawn mower;
   said transmission means comprising, two transmission pulley means concentrically disposed upon an additional shaft means, at least of one said transmission pulley means being slidable along said additional shaft; and
   leveling means provided at the corners of said lawn mower body frame and being operatively connected to each of said front and rear wheels.

5. A lawn mower according to claim 1, wherein said transmission means includes a reduction pulley operatively connected to said motor and a transmission pulley vertically mounted relative to said lawn mower body.

6. A lawn mower according to claim 5, wherein vertical movement of said transmission pulley adjusts the tension in said belt means.

7. A lawn mower according to claim 1, 2, or 4, wherein said first and second pulley means includes two sections each being operatively connected to one of said separate first and second shaft means, and one of said pulley sections being slidable and spring biased along its respective shaft towards said other pulley section.

8. A lawn mower according to claim 4, wherein said link mechanism includes a series of links operatively connected relative to each other and operatively connected to said rear wheels and said change pulley to adjust the height of the lawn mower body with respect to said rear wheels.

* * * * *

UNITED STATES PATENT AND TRADEMARK OFFICE
CERTIFICATE OF CORRECTION

PATENT NO. : 4,322,934
DATED : April 6, 1982
INVENTOR(S) : Hachiro Doi

It is certified that error appears in the above—identified patent and that said Letters Patent is hereby corrected as shown below:

ON THE TITLE PAGE:

In the category entitled "[30] Foreign Application Priority Data", after "Nov. 26, 1979 [JP] Japan ... 54-153160" insert the following:

-- Nov. 26, 1979 [JP] Japan ........ 54-153161 --

Signed and Sealed this

Eighth Day of June 1982

[SEAL]

Attest:

GERALD J. MOSSINGHOFF
Attesting Officer    Commissioner of Patents and Trademarks